United States Patent
Yamamoto (10) Patent No.: US 6,377,634 B1
(45) Date of Patent: Apr. 23, 2002

(54) CIRCUIT FOR REPRODUCING BIT TIMING AND METHOD OF REPRODUCING BIT TIMING

(75) Inventor: Takeshi Yamamoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/210,932

(22) Filed: Dec. 15, 1998

(30) Foreign Application Priority Data

Dec. 15, 1997 (JP) .............................. 9-363522

(51) Int. Cl.[7] .............................................. H04L 27/22
(52) U.S. Cl. ...................................... 375/324; 375/355
(58) Field of Search ................................ 375/316, 324, 375/332, 355, 279, 281, 327, 329, 340, 344; 329/307; 370/503, 506, 516, 517

(56) References Cited

U.S. PATENT DOCUMENTS

| | | | | |
|---|---|---|---|---|
| 4,941,155 A | | 7/1990 | Chuang et al. | 375/330 |
| 5,588,025 A | * | 12/1996 | Strolle et al. | 375/316 |
| 5,654,989 A | * | 8/1997 | Gurney et al. | 375/355 |
| 5,671,257 A | | 9/1997 | Cochran et al. | 375/355 |
| 5,793,250 A | * | 8/1998 | Fukushi | 329/307 |
| 5,838,737 A | * | 11/1998 | Yamaguchi et al. | 375/331 |
| 5,872,818 A | * | 2/1999 | Choi | 375/355 |
| 6,198,780 B1 | * | 3/2001 | Kang | 375/321 |

FOREIGN PATENT DOCUMENTS

| | | |
|---|---|---|
| EP | 0 751 645 A1 | 1/1997 |
| JP | 5-211532 | 8/1993 |
| JP | 5-260107 | 10/1993 |
| JP | 6-14070 | 1/1994 |
| JP | 6-284159 | 10/1994 |
| JP | 7-50700 | 2/1995 |
| JP | 7-212419 | 8/1995 |
| JP | 7-283843 | 10/1995 |
| JP | 8-79323 | 3/1996 |
| JP | 8-149173 | 6/1996 |
| JP | 9-8856 | 1/1997 |
| JP | 9-26649 | 10/1997 |

OTHER PUBLICATIONS

Japanese Office Action, dated Jul. 13, 2000, with English language translation of Japanese Examiner's comments.

(List continued on next page.)

Primary Examiner—Stephen Chin
Assistant Examiner—Chieh M. Fan
(74) Attorney, Agent, or Firm—Whitman, Curtis & Christofferson, P.C.

(57) ABSTRACT

There is provided a circuit for reproducing bit timing, including (a) a first analog-digital converter for converting a real part signal of a complex modulation signal into a real part digital signal, the complex modulation signal having a base band frequency band and obtained from a received modulation signal modulated into a digital phase, (b) a second analog-digital converter for converting an imaginary part signal of the complex modulation signal into an imaginary part digital signal, (c) a first detector for receiving the real part digital signal and the imaginary part digital signal, detecting a phase angle of the complex modulation signal on a complex plane, and transmitting a first signal indicative of the phase angle, (d) a delay circuit for delaying the first signal by a symbol interval, (e) a second detector for detecting a difference in phase on the complex plane between the complex modulation signals in the symbol interval, (f) a third detector for detecting a timing gap between a sampling clock and an optimum sampling point, based on the difference in phase, detected by the second detector, and transmitting a second signal indicative of the timing gap, and (g) a signal converter for converting each of the real part digital signal and the imaginary part digital signal into a signal associated with the optimum sampling point, based on the second signal. The circuit is hardly influenced by noises and non-linear strains, and is capable of reducing power consumption and accomplishing maintenance free.

20 Claims, 5 Drawing Sheets

OTHER PUBLICATIONS

Japanese Office Action, dated Dec. 26, 2000, with English language translation of Japanese Examiner's comments.

Yoichi Matsumoto et. al, A Burst Mode All–Digital High Speed Clock Recovery Circuit, Jun. 1992, B–II vol. J 75–B–II No. 6 pp. 354–362.

Keiji Takakusaki et.al, Development of Digital Controlled Clock Oscillator for Delay Lock Loop, 1996, p. 372.

Canadian Office Action, dated Jan. 29, 2001, with Canadian Examiner's comments.

* cited by examiner

CIRCUIT FOR REPRODUCING BIT TIMING AND METHOD OF REPRODUCING BIT TIMING

BACKGROUND OF THE INVENTION

1. Field of the Invention

The invention relates to a circuit for reproducing bit timing, and more particularly to such a circuit for detecting a timing gap between a sampling clock and an optimal sampling clock, based on a real part digital signal and an imaginary part digital signal obtained by digitizing a real part and an imaginary part of a complex modulation signal having a base band frequency band and obtained from a received modulation signal modulated into a digital phase.

2. Description of the Related Art

An apparatus for demodulating burst signals having been modulated into a digital phase is often provided at an input stage thereof with an automatic gain control circuit (hereinafter, referred to simply as "AGC") in order to suppress fluctuation in received signals in a transmission path. It is necessary to use a preamble in order to converge AGC.

As is well known, a preamble is a signal indicating that data to be transmitted from a transmitter to a receiver at any time has been transmitted to a receiver, and establishing synchronization between a transmitter and a receiver.

A burst signal having been modulated into a digital phase is designed to have a preamble at the head thereof for reproducing bit timing, to thereby establish synchronization.

Figure 3:
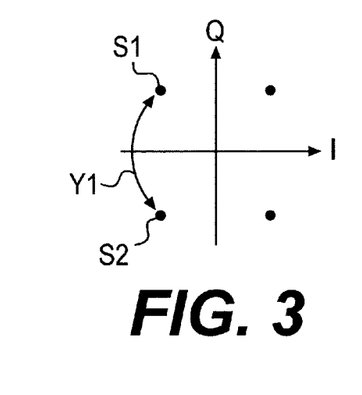
FIG. 3 is a view illustrating signal phases in the circuit illustrated in FIG. 1.

Bit timing of quadrature phase shift keying (QPSK) is usually reproduced through the use of a preamble pattern in which signals existing on a diagonal line are repeatedly transmitted in such an arrangement of signal points as an arrangement illustrated in FIG. 3, which is a signal phase diagram, and has I-axis as an axis of abscissa and Q-axis as an axis of ordinate.

The above-mentioned reproduction of bit timing is controlled, for instance, by zero-cross detection in which timing at which a signal passes an origin is detected.

In zero-cross detection, there is used sampling data having a small amplitude around an origin. However, sampling data having a small amplitude is accompanied with a problem of being readily influenced by noises and non-linear strains to thereby generate errors.

In burst transmission system making use of digital phase modulation, it is necessary to rapidly carry out bit synchronization and demodulation such as reproduction of a carrier wave. To this end, a burst signal is provided at a head thereof with a preamble.

In order to enhance a transmission rate, it is preferable to shorten a preamble to thereby rapidly establish bit synchronization.

For instance, Japanese Unexamined Patent Publication No. 5-211532 has suggested a rapid bit synchronization system in which a π/2-shifted BPSK signal or a π/4-shifted QPSK signal is employed, and needs to have a zero-π/2 modulated preamble or a zero-3π/4 modulated preamble, respectively.

A signal obtained by detecting a π/2-shifted BPSK signal or a π/4-shifted QPSK signal in quasi-synchronization is digitally quantized into one bit signal by means of an analog-digital converter through the use of clock signals transmitted from an oscillator, and then, variation in phase is detected by a phase-variation detector.

A complex sine wave generator generates a complex sine wave having a frequency of N/2 in response to a clock signal transmitted from an oscillator. A multiplier multiplies the thus generated complex sine wave by the variation in phase detected by the phase-variation detector to thereby calculate a relation in phase between a frequency component of 1/2 bit and the complex sine wave. The result of calculation is averaged through a low-pass filter, and then, a reverse tangent of an output transmitted from the low-pass filter is calculated by a reverse tangent calculator.

The reverse tangent calculator transmits its output at a timing which is represented within ±π under a two-bit interval. In order to covert a bit timing of an output timing of the reverse tangent calculator into a bit timing represented within ±π under a one-bit interval, the reverse tangent is doubled by means of a doubling device, and a remainder is calculated when the thus doubled reverse tangent is divided by 2π.

An output transmitted from an analog-digital converter is sampled or interpolated by a sampler or an interpolator at a bit timing at which the doubling device generates an output.

Japanese Unexamined Patent Publication No. 5-260107 has suggested a perpendicular modulator for demodulating n-PSK wave signals, wherein n indicates phase modulation. The suggested perpendicular modulator interpolates sampled n-PSK wave signals when n-PSK wave signals are digitally sampled and perpendicularly detected.

The suggested perpendicular modulator is designed to include two analog-digital converters for sampling n-PSK wave signals at a constant interval to thereby reproduce base band signals. Then, the thus reproduced base band signals are interpolated by means of an interpolation circuit. A re-timing device carries out re-timing treatment to the thus interpolated base band signals in response to a bit timing signal. Then, a detector detects the thus re-timed base band signals to thereby reproduce data sequence. Then, a bit timing reproducer generates a bit timing signal, based on a timing of the thus reproduced data sequence.

Japanese Unexamined Patent Publication No. 6-284159 has suggested a digital demodulator including a clock synchronization circuit which extracts a phase component of received clocks, and control a phase of a timing clock.

In accordance with the suggested digital demodulator, a base band signal having been modulated under four-value digital modulation is sampled at a rate twice greater than a modulation rate to thereby convert the base band signal into digital data. Detection data detected by a delay detection circuit is judged by a judgement circuit with judgement timing clocks, and then, is transmitted to a limiter circuit having a function of interpolation.

The limiter circuit interpolates one or more of adjacent two sampling values of detected outputs, puts the thus interpolated value into a limiter, and transmits one-bit interpolated data to a digital band pass filter.

In response to transmission of an output from the digital band pass filter, a circuit for detecting an error in phase detects an error in phase in a timing clock. Then, the circuit for detecting an error in phase transmits a signal indicative of an error in phase to a circuit for reproducing a clock, in accordance with the result of comparison in phase between the thus detected error in phase and a current timing clock. Then, the circuit for reproducing a clock compensates for a phase of a timing clock.

Japanese Unexamined Patent Publication No. 7-50700 has suggested a circuit for reproducing a carrier wave for detecting a phase of preamble.

In the suggested circuit, first and second multipliers each multiplies an offset QPSK modulation wave by a reproduced carrier wave having a phase shifted by π/2 from a phase of the offset QPSK modulation wave. An output transmitted from the first multiplier is delayed by a half interval of symbol rate relative to an output transmitted from the second multiplier, by means of a delay circuit. Then, a phase comparator for reproducing a bit timing converts outputs transmitted from the delay circuit and the second multiplier into a signal having a phase including two phase-stable points.

Japanese Unexamined Patent Publication No. 7-212419 has suggested an apparatus for extracting a clock for detecting a phase of preamble.

In this apparatus, a relative phase of a carrier wave of a π/4-shifted QPSK is input into a relative phase detector. The relative phase detector includes first and second counters each of which counts signals having a frequency equal to a M times multiplied sum of a frequency of a carrier wave of a π/4-shifted QPSK signal transmitted from an oscillator and a shifted frequency.

The relative phase detector includes an amplitude limiter. The amplitude limiter slides an amplitude of the carrier wave to thereby transmit a rectangular wave as a carrier wave. A rise-up detecting circuit detects rise-up of the carrier wave, and resets the first counter. Then, a circuit for subtraction subtracts an output transmitted from the first counter from an output transmitted from the second counter to thereby transmit a relative phase of the carrier wave of the π/4-shifted QPSK signal.

Then, the subtraction circuit calculates a difference between the relative phase and a phase prior to the relative phase by a half symbol. When a phase difference detector detects that the thus calculated difference becomes equal to a predetermined value, a reference signal generator transmits a reference signal.

On the other hand, a demodulator may be designed to include a limiter amplifier for suppressing fluctuation in an input level to be introduced to the demodulator. The limiter amplifier keeps an output level transmitted from the demodulator constant regardless of an input level. As a result, it is no longer necessary to use a preamble for AGC, which ensures a shorter preamble.

However, the use of a limiter amplifier is accompanied with a problem that performances of the demodulator is much deteriorated due to non-linear strain which is caused by the limiter amplifier. Hence, the demodulator is necessary to be provided with a countermeasure against such non-linear strain All of the above-mentioned conventional apparatuses or circuits are not provided with a countermeasure to avoid influences due to non-linear strain and/or an error caused by noises, and hence, are accompanied with a problem of deterioration of performances due to non-linear strain.

SUMMARY OF THE INVENTION

In view of the above-mentioned problem, it is an object of the present invention to provide a circuit for reproducing a bit timing and a method of doing the same both of which are hardly influenced by noises and errors caused by non-linear strain, and are capable of fabricating a semiconductor device in a smaller size to thereby reduce power consumption.

In one aspect of the present invention, there is provided a circuit for reproducing bit timing, including (a) a first analog-digital converter for converting a real part signal of a complex modulation signal into a real part digital signal, the complex modulation signal having a base band frequency band and obtained from a received modulation signal modulated into a digital phase, (b) a second analog-digital converter for converting an imaginary part signal of the complex modulation signal into an imaginary part digital signal, (c) a first detector for receiving the real part digital signal and the imaginary part digital signal, detecting a phase angle of the complex modulation signal on a complex plane, and transmitting a first signal indicative of the phase angle, (d) a delay circuit for delaying the first signal by a symbol interval, (e) a second detector for detecting a difference in phase on the complex plane between the complex modulation signals in the symbol interval, (f) a third detector for detecting a timing gap between a sampling clock and an optimum sampling point, based on the difference in phase, detected by the second detector, and transmitting a second signal indicative of the timing gap, and (g) a signal converter for converting each of the real part digital signal and the imaginary part digital signal into a signal associated with the optimum sampling point, based on the second signal.

In accordance with the above-mentioned circuit, the first analog-digital converter converts a real part signal of a complex modulation signal, which has a base band frequency band and is obtained from a received modulation signal having been modulated into a digital phase, into a real part digital signal, and the second analog-digital converter converts an imaginary part signal of the complex modulation signal into an imaginary part digital signal. The thus obtained real part digital signal and imaginary part digital signal are input into the first detector.

The first detector having received the real part digital signal and the imaginary part digital signal detects a phase angle of the complex modulation signal on a complex plane, and then, transmits the first signal indicative of the phase angle, to both the delay circuit and the second detector. The delay circuit delays the first signal by a symbol interval, and then, transmits the delayed first signal to the second detector. The second detector makes subtraction between the first signal and an output signal transmitted from the delay circuit to thereby detect a difference in phase on the complex plane between the complex modulation signals in the symbol interval. A signal indicative of the thus detected difference in phase is transmitted to the third detector.

The third detector detects a timing gap between a sampling clock and an optimum sampling point, based on the difference in phase detected by the second detector, and transmits the second signal indicative of the timing gap to the signal converter.

The signal converter converts each of the real part digital signal and the imaginary part digital signal into a signal associated with the optimum sampling point, based on the second signal.

The circuit in accordance with the invention is hardly influenced by noises and errors caused by non-linear strain, and makes it possible to fabricate a semiconductor device in a smaller size, reduce power consumption, and accomplish maintenance free.

It is preferable that the above-mentioned circuit further includes a clock oscillator transmitting fixed clock signals, in which case, the first analog-digital converter samples and quantizes the real part signal with the fixed clock signals to thereby convert the real part signal into the real part digital signal.

It is also preferable that the above-mentioned circuit further includes a clock oscillator transmitting fixed clock signals, in which case, the second analog-digital converter samples and quantizes the imaginary part signal with the fixed clock signals to thereby convert the imaginary part signal into the imaginary part digital signal.

For instance, the second detector may be comprised of a subtracter for making subtraction between the first signal and an output signal transmitted from the delay circuit.

There is further provided a circuit for reproducing bit timing, including (a) a first analog-digital converter for converting a real part signal of a complex modulation signal into a real part digital signal, the complex modulation signal having a base band frequency band and obtained from a received modulation signal modulated into a digital phase, (b) a second analog-digital converter for converting an imaginary part signal of the complex modulation signal into an imaginary part digital signal, (c) a first detector for receiving the real part digital signal and the imaginary part digital signal, detecting a phase angle of the complex modulation signal on a complex plane, and transmitting a first signal indicative of the phase angle, (d) a delay circuit for delaying the first signal by a symbol interval, (e) a second detector for detecting a difference in phase on the complex plane between the complex modulation signals in the symbol interval, (f) a third detector for detecting a timing gap between a sampling clock and an optimum sampling point, based on the difference in phase, detected by the second detector, and transmitting a second signal indicative of the timing gap, (g) a first interpolating filter for converting the real part digital signal into a signal associated with an optimum sampling point, based on the second signal, and (h) a second interpolating filter for converting the imaginary part digital signal into a signal associated with an optimum sampling point, based on the second signal.

There is still further provided a circuit for reproducing bit timing, including (a) a first analog-digital converter for converting a real part signal of a complex modulation signal into a real part digital signal, the complex modulation signal having a base band frequency band and obtained from a received modulation signal modulated into a digital phase, (b) a second analog-digital converter for converting an imaginary part signal of the complex modulation signal into an imaginary part digital signal, (c) a first detector for receiving the real part digital signal and the imaginary part digital signal, detecting a phase angle of the complex modulation signal on a complex plane, and transmitting a first signal indicative of the phase angle, (d) a delay circuit for delaying the first signal by a symbol interval, (e) a second detector for detecting a difference in phase on the complex plane between the complex modulation signals in the symbol interval, (f) a third detector for detecting a timing gap between a sampling clock and an optimum sampling point, based on the difference in phase, detected by the second detector, and transmitting a second signal indicative of the timing gap, (g) a clock oscillator for transmitting fixed clock signals, and (h) a programmable phase shifter for shifting a phase of the fixed clock signals, based on the second signal.

In another aspect of the present invention, there is provided a method of reproducing bit timing, including the steps of (a) converting a real part signal of a complex modulation signal into a real part digital signal, the complex modulation signal having a base band frequency band and obtained from a received modulation signal modulated into a digital phase, (b) converting an imaginary part signal of the complex modulation signal into an imaginary part digital signal, (c) detecting a phase angle of the complex modulation signal on a complex plane, based on the real part digital signal and the imaginary part digital signal, and transmitting a first signal indicative of the thus detected phase angle, (d) delaying the first signal by a symbol interval, (e) detecting a difference in phase on the complex plane between the complex modulation signals in the symbol interval, (f) detecting a timing gap between a sampling clock and an optimum sampling point, based on the difference in phase, and (g) converting each of the real part digital signal and the imaginary part digital signal into a signal associated with the optimum sampling point, based on the timing gap.

It is preferable that the real part signal is sampled and quantized with fixed clock signals to thereby be converted into the real part digital signal in the step (a).

It is also preferable that the imaginary part signal is sampled and quantized with fixed clock signals to thereby be converted into the imaginary part digital signal in step (b).

For instance, the difference in phase may be detected by making subtraction between the complex modulation signals in the symbol interval in the step (e).

There is further provided a method of reproducing bit timing, including the steps of (a) converting a real part signal of a complex modulation signal into a real part digital signal, the complex modulation signal having a base band frequency band and obtained from a received modulation signal modulated into a digital phase, (b) converting an imaginary part signal of the complex modulation signal into an imaginary part digital signal, (c) detecting a phase angle of the complex modulation signal on a complex plane, based on the real part digital signal and the imaginary part digital signal, and transmitting a first signal indicative of the thus detected phase angle, (d) delaying the first signal by a symbol interval, (e) detecting a difference in phase on the complex plane between the complex modulation signals in the symbol interval, (f) detecting a timing gap between a sampling clock and an optimum sampling point, based on the difference in phase, and (g) shifting a phase of fixed clock signals, based on the timing gap.

In the specification, BPSK is an acronym of "Binary Phase Shift Keying", QPSK is an acronym of "Quadrature Phase Shift Keying", MSK is an acronym of "Minimum Shift Keying", and GMSK is an acronym of "Gaussian filtered Minimum Phase Shift Keying".

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
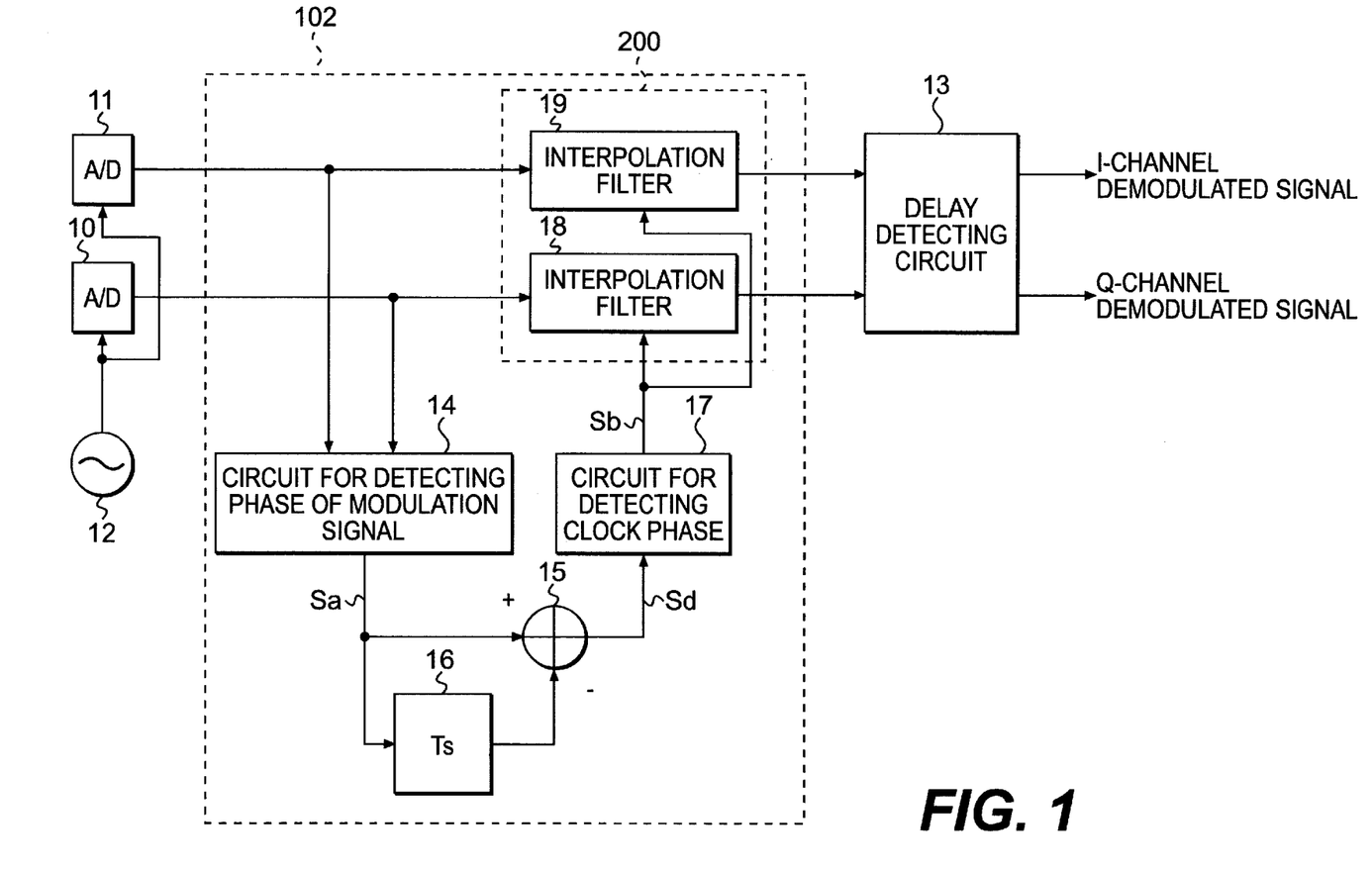
FIG. 1 is a block diagram illustrating a circuit for reproducing bit timing, in accordance with the first embodiment of the present invention.

FIG. 1 is a block diagram illustrating a circuit for reproducing bit timing, in accordance with the first embodiment.

In order to make it easy to understand the circuit illustrated in FIG. 1, a demodulator including the circuit illustrated in FIG. 1 is first explained hereinbelow with reference to FIG. 2.

Figure 2:
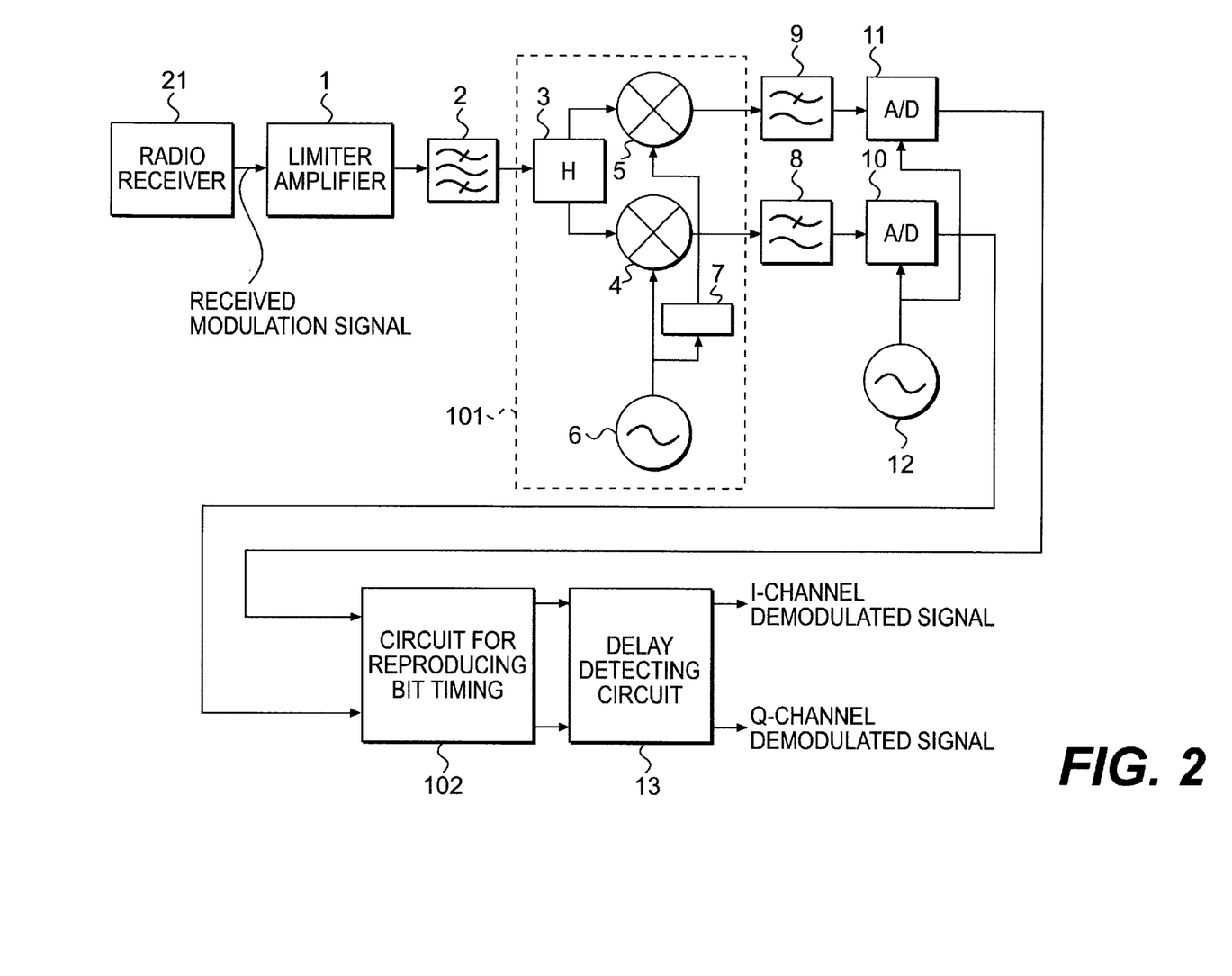
FIG. 2 is a block diagram of a demodulator including the circuit illustrated in FIG. 1.

With reference to FIG. 2, a received modulation signal having been modulated into a digital phase is input into a limiter amplifier 1 from a radio receiver 21. Even if the radio receiver 21 receives radio signals having been fluctuated in level in a transmission path, the limiter amplifier 1 smoothes the level fluctuation of the received radio signals when the received radio signals are input into the demodulator.

The limiter amplifier 1 transmits its output to a band pass filter 2. The band pass filter 2 removes an unnecessary wave caused by non-linear strain accompanied with an operation of smoothing the level fluctuation in the received modulation signal, carried out by the limiter amplifier 1, and then, transmits the received modulation signal into a distributor 3 constituting a part of a perpendicular quasi-synchronization detector 101.

The distributor 3 bifurcates the received modulation signal, and transmits the bifurcated signals into each of first input ports of a first multiplier 4 and a second multiplier 5. The first multiplier 4 further receives at a second input port thereof a local signal approximately identical with a carrier wave of a modulation signal transmitted from an oscillator 6.

The first multiplier 4 multiplies the local signal by the bifurcated modulation signal transmitted from the distributor 3, to thereby generate a real part signal of a complex modulation signal having a base band frequency band. The thus generated real part signal is transmitted into a first low pass filter 8.

The local signal is transmitted further to a π/2-phase shifter 7 from the oscillator 6. The π/2-phase shifted local signal is transmitted to a second input port of the second multiplier 5 from the π/2-phase shifter 7.

Then, the second multiplier 5 multiplies the π/2-phase shifted local signal by the bifurcated modulation signal transmitted from the distributor 3, to thereby generate an imaginary part signal of a complex modulation signal having a base band frequency band. The thus generated imaginary part signal is transmitted into a second low pass filter 9.

The first low pass filter 8 removes unnecessary high-frequency waves out of the real part signal of the complex modulation signal, and then, transmits the real part signal to a first analog-digital (A/D) converter 10.

Similarly, the second low pass filter 9 removes unnecessary high-frequency waves out of the imaginary part signal of the complex modulation signal, and then, transmits the imaginary part signal to a second analog-digital (A/D) converter 11.

A clock oscillator 12 transmits fixed clocks to the first and second analog-digital converters 10 and 11. The first analog-digital converter 10 samples and quantizes the received real part signal of the complex modulation signal in response to the fixed clocks received from the oscillator 12, to thereby convert the real part signal into a real part digital signal. Similarly, the second analog-digital converter 11 samples and quantizes the received imaginary part signal of the complex modulation signal in response to the fixed clocks received from the oscillator 12, to thereby convert the imaginary part signal into an imaginary part digital signal.

Both the real part digital signal transmitted from the first analog-digital converter 10 and the imaginary part digital signal transmitted from the second analog-digital converter 11 are introduced into a circuit 102 for reproducing bit timing, in accordance with the first embodiment, and converted into signals associated with optimal sampling points by the circuit 102.

The real part digital signal and the imaginary part digital signal having been converted into signals associated with optimal sampling points are input into a delay detecting circuit 13. The real part digital signal and the imaginary part digital signal are delayed and detected in the delay detecting circuit 13, and resultingly, the delay detecting circuit 13 outputs I-channel demodulation signal and Q-channel demodulation signal.

Hereinbelow is explained a structure of the circuit 102 for reproducing bit timing, with reference to FIG. 1.

Both the real part digital signal transmitted from the first analog-digital converter 10 and the imaginary part digital signal transmitted from the second analog-digital converter 11 are introduced into a circuit 14 for detecting a phase of a modulation signal.

The real part digital signal transmitted from the first analog-digital converter 10 is introduced further into the delay detecting circuit 13 through a first interpolation circuit 18, and similarly, the imaginary part digital signal transmitted from the second analog-digital converter 11 is introduced further into the delay detecting circuit 13 through a second interpolation circuit 19.

The circuit 14 for detecting a phase of a modulation signal receives the real part digital signal and the imaginary part digital signal to thereby detect a phase angle of the complex modulation signal on a complex plane, and transmits a first signal Sa indicative of the thus detected phase angle to both a first input port of a subtracter 15 and an input port of a delay circuit 16.

The delay circuit 16 delays the first signal Sa received from the circuit 14, by a symbol interval Ts, and transmits the thus delayed signal to a second input port of the subtracter 15.

The subtracter 15 makes subtraction between the first signal Sa and the delayed signal to thereby detect a difference in phase on a complex plane among the modulation signals in the symbol interval Ts.

The difference in phase detected by the subtracter 15 is transmitted into a circuit 17 for detecting a clock phase. The circuit 17 for detecting a clock phase detects a timing gap between a sampling clock and an optimal sampling point, based on the received difference in phase, and transmits the detection result, that is, a second signal Sb indicative of the thus detected timing gap to both the first interpolation circuit 18 and the second interpolation circuit 19.

The first interpolation circuit 18 and the second interpolation circuit 19 cooperates with each other to thereby constitute a signal converter 200 which converts the real part digital signal transmitted from the first analog-digital converter 10, into a signal associated with an optimal sampling point, and converts the imaginary part digital signal transmitted from the second analog-digital converter 11, into a signal associated with an optimal sampling point, based on the second signal Sb indicative of the timing gap.

Outputs transmitted from the first and second interpolation circuits 18 and 19 are introduced into the de lay detecting circuit 13.

The circuit 102 for reproducing bit timing has such a structure as mentioned so far.

Hereinbelow is explained an operation of the circuit for reproducing bit timing, in accordance with the first embodiment.

As mentioned earlier, the first low pass filter 8 removes unnecessary high-frequency waves out of the real part signal of the complex modulation signal, and transmits the real part signal to the first analog-digital converter 10. In the same way, the second low pass filter 9 removes unnecessary high-frequency waves out of the imaginary part signal of the complex modulation signal, and transmits the imaginary part signal to the second analog-digital converter 11.

The first analog-digital converter 10 receives fixed clocks from the clock oscillator 12, and samples the real part signal of the complex modulation signal in response to the fixed clocks, to thereby convert the real part signal to the real part digital signal. Similarly, the second analog-digital converter 11 receives fixed clocks from the clock oscillator 12, and samples the imaginary part signal of the complex modulation signal in response to the fixed clocks, to thereby convert the imaginary part signal to the imaginary part digital signal.

The thus produced real part digital signal and imaginary part digital signal are transmitted into the circuit 14 for detecting a phase of a modulation signal.

The circuit 14 for detecting a phase of a modulation signal receives the real part digital signal and the imaginary part digital signal to thereby detect a phase angle of the complex modulation signal on a complex plane, and transmits the first signal Sa indicative of the thus detected phase angle to both a first input port of the subtracter 15 and the delay circuit 16.

The delay circuit 16 produces a signal delayed by the symbol interval Ts from the first signal Sa, and transmits the thus produced, delayed signal to a second input port of the subtracter 15.

The subtracter 15 subtracts the first signal Sa received from the circuit 14 from the delayed signal received from the delay circuit 16 to thereby detect a difference in phase of those signals on a complex plane in the symbol interval Ts. Then, the subtracter 15 transmits a signal Sd indicative of the thus detected difference in phase to the circuit 17 for detecting a phase of clocks.

In accordance with the above-mentioned first embodiment, synchronization is established by means of a preamble arranged at a head of a burst signal and used for reproducing bit timing. Herein, it is assumed that a clock is sufficiently stable, and synchronization is kept established in a burst until the burst ends, even if a control through the use of clocks is ceased, after synchronization has been once established by means of a preamble.

For instance, it is assumed that a preamble to be used in QPSK modulation system has a pattern wherein two signals S1 and S2, bridged by an arrow Y1 in FIG. 3, a signal phase diagram, is alternately repeated.

Figure 4:
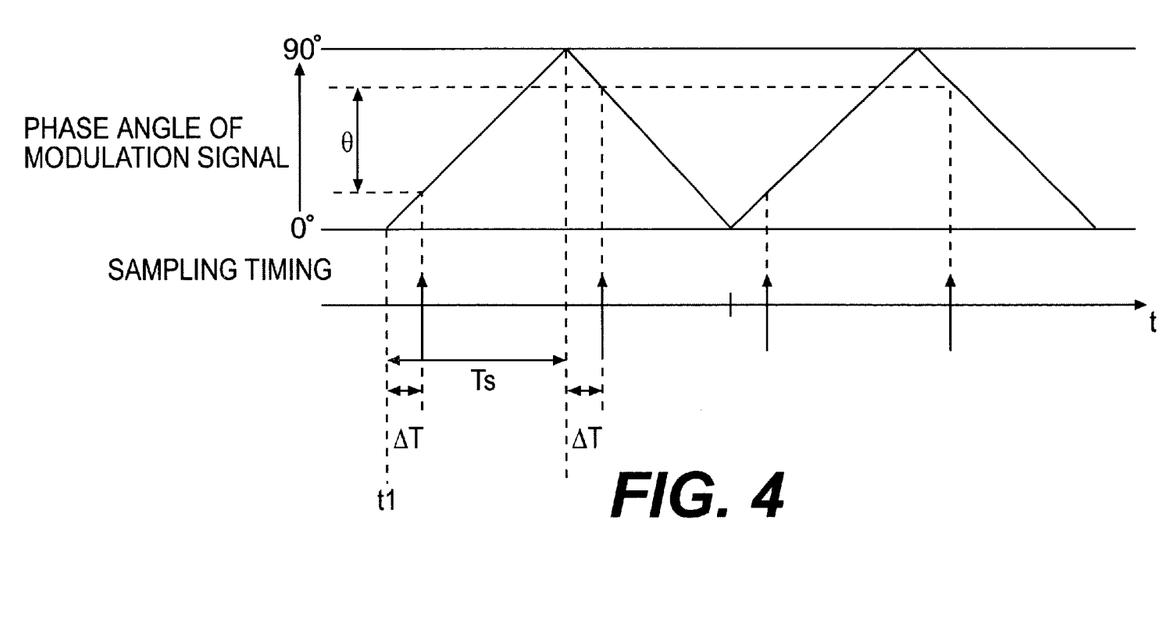
FIG. 4 is a view illustrating a relation between a timing at which a modulation signal is sampled and a phase angle of a modulation signal in the circuit illustrated in FIG. 1.

Assuming one of the signals S1 and S2 is considered as a standard, a phase angle of a modulation signal would have a pattern comprised of repeated waveforms, as illustrated in FIG. 4.

It is assumed in FIG. 4 that a timing gap between a sampling clock and an optimal sampling point t1 is represented by $\Delta T$, and a phase difference between modulation signals in a symbol interval Ts is represented by $\theta$. Under the assumption, a relation between the timing gap $\Delta T$ and the phase different $\theta$ is represented as follows.

$\theta = 90° \times (1 - 2 \times \Delta T/Ts)$ $\therefore \Delta T/Ts = (1/2 - \theta/180°)$ In accordance with the above-mentioned equation, it is possible to detect the timing gap between a sampling clock and an optimal sampling point t1, represented by $\Delta T/Ts$, can be calculated based on the phase difference $\theta$ on a complex plane between the modulation signals in the symbol interval Ts.

The circuit 17 for detecting a clock phase detects a timing gap between a sampling clock between an optimal sampling point in the above-mentioned manner, averages the timing gap in a preamble, and transmits a second signal Sb indicative of the thus detected timing gap to the first and second interpolation filters 18 and 19.

The first interpolation filter 18 receives the second signal Sb from the circuit 17, and converts the real part digital signal received from the first analog-digital converter 10, into a signal associated with an optimal sampling point, based on the second signal Sb indicative of the timing gap.

Similarly, the second interpolation filter 19 receives the second signal Sb from the circuit 17, and converts the imaginary part digital signal received from the second analog-digital converter 11, into a signal associated with an optimal sampling point, based on the second signal Sb indicative of the timing gap.

Figure 5:
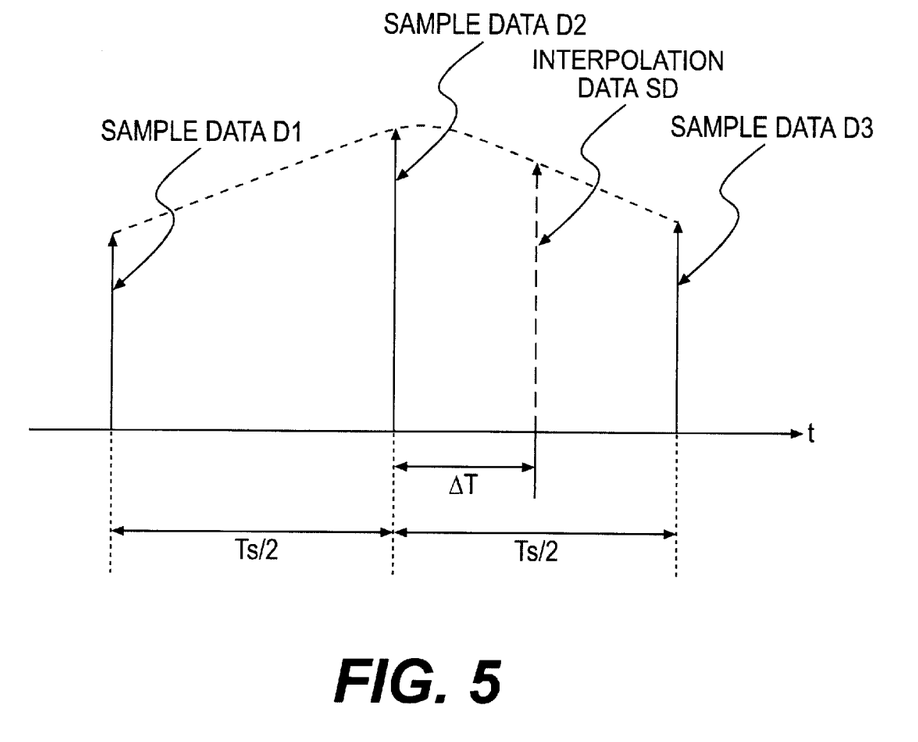
FIG. 5 is a view illustrating interpolation of sampled data by means of an interpolating filter in the circuit illustrated in FIG. 1.

For instance, when sample data D1, D2, and D3 having an interval equal to Ts/2 among one another are input for converting the real or imaginary part digital signal into an optimal signal, as illustrated in FIG. 5, data SD is presumed by interpolation. Herein, data SD is data delayed by the timing gap $\Delta T$ from the sample data D2.

The operation of the first and second interpolation filters 18 and 19 is described in "Burst Mode All-Digitized High-Speed Clock Reproducing Circuit", by Matsumoto, Morikura, and Kato, Electronic Data Communication Institute Articles, Vol. J75-B-II, June 1992, No. 6.

An interpolation filter requires data sampled at a speed at least twice greater than a symbol speed, whereas the circuit 17 for detecting a clock phase requires data sampled at a speed equal to a symbol speed.

The real part digital signal having been converted into the signal associated with an optimal sampling point by means of the first interpolation filter 18 is transmitted to the delay detecting circuit 13, and the imaginary digital signal having been converted into the signal associated with an optimal sampling point by means of the second interpolation filter 19 is transmitted also to the delay detecting circuit 13.

The delay detecting circuit 13 delays the thus received real and imaginary part digital signals, and transmits I-channel and Q-channel demodulation signals as output signals.

The circuit 102 for reproducing bit timing, in accordance with the first embodiment, uses a preamble which does not pass an origin of a complex plane of a modulation signal, as illustrated in FIG. 3.

Thus, the circuit 102 detects a phase of a sampling clock without using sampling data located in the vicinity of the origin and having a small amplitude. Accordingly, the circuit 102 is hardly influenced by noises and errors caused by non-linear strain.

In order to detect a clock phase, a sampling speed twice greater than a symbol speed has been conventionally required, but the circuit 102 for reproducing bit timing, in accordance with the first embodiment, can operate at a symbol speed.

Accordingly, the circuit 102 in accordance with the first embodiment is resistant to non-linear strain, and is capable of reducing power consumption, fabricating a semiconductor device in a smaller size in the form of LSI, and accomplishing maintenance free.

Figure 6:
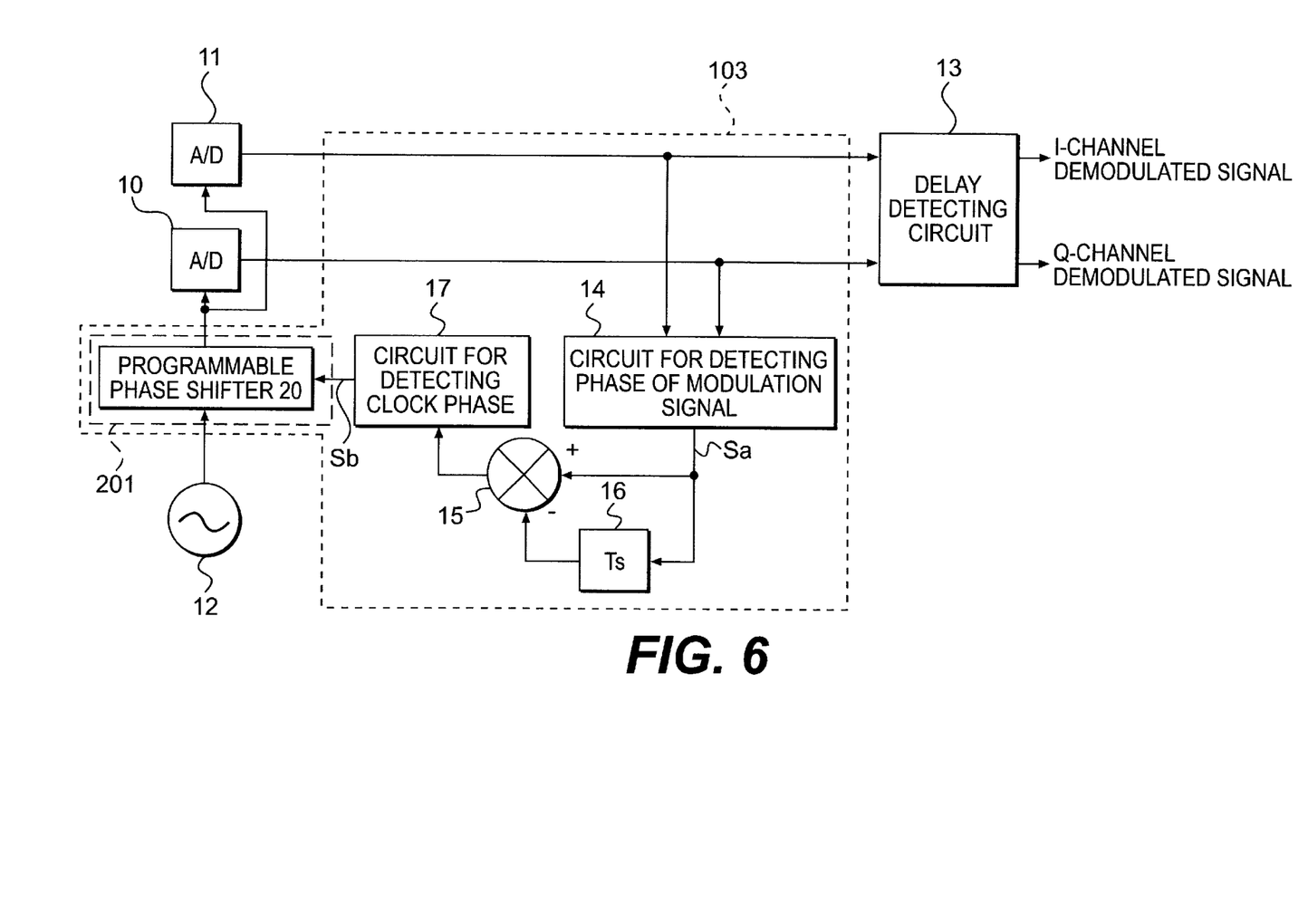
FIG. 6 is a block diagram illustrating a circuit for reproducing bit timing, in accordance with the second embodiment of the present invention.

FIG. 6 is a block diagram illustrating a circuit for reproducing bit timing, in accordance with the second embodiment. Parts or elements that correspond to those of the first embodiment illustrated in FIGS. 1 and 2 have been provided with the same reference numerals.

As would be obvious from comparison of FIG. 6 with FIG. 1, a circuit 103 for reproducing bit timing, in accordance with the second embodiment, is provided with a signal converter 201 having a different structure from a structure of the signal converter 200 of the circuit 102 for reproducing bit timing, in accordance with the first embodiment.

That is, the signal converter 200 in the first embodiment is comprised of the first interpolation filter 18 and the second interpolation filter 19, whereas the signal converter 201 in the second embodiment is comprised of a programmable phase shifter 20.

In the circuit 103 in accordance with the second embodiment, the second signal Sb indicative of the timing gap, transmitted from the circuit 17 for detecting a clock phase, is input into the programmable phase shifter 20, which shifts a phase of fixed clocks transmitted from the clock oscillator 12, based on the second signal Sb. In the second embodiment, a phase of fixed clocks transmitted from the clock oscillator 12 is shifted unlike the first embodiment.

In accordance with clocks transmitted from the clock oscillator 12 and phase-shifted by the programmable phase shifter 20, the first analog-digital converter 10 samples and quantizes a real part signal of a complex modulation signal to thereby convert the real part signal into a real part digital signal, which is transmitted to both the circuit 14 for detecting a phase of a modulation signal and the delay detecting circuit 13.

Similarly, in accordance with clocks transmitted from the clock oscillator 12 and phase-shifted by the programmable phase shifter 20, the second analog-digital converter 11 samples and quantizes an imaginary part signal of a complex modulation signal to thereby convert the imaginary part signal into an imaginary part digital signal, which is transmitted to both the circuit 14 for detecting a phase of a modulation signal and the delay detecting circuit 13.

The other operation is the same as the operation carried out by the circuit 102 in accordance with the first embodiment.

The programmable phase shifter 20 is described, for instance, in "Development of Digitally Controlled Clock Oscillator for DDL", by Takakusaki, Electronic Data Communication Institute, Communication Society Conference, B-371, 1996.

All parts constituting the circuit 103 in accordance with the second embodiment, including the first and second analog-digital converters 10 and 11, operate at a symbol speed.

In addition, since the circuit 103 for reproducing bit timing, in accordance with the second embodiment, uses a preamble which does not pass an origin of a complex plane of a modulation signal, as illustrated in FIG. 3, the circuit 103 can be applied to modulation system in which a modulation signal does not pass an origin of a complex plane, such as π/4-shifted QPSK, MSK, or GMSK.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-363522 filed on Dec. 15, 1997 including specification, claims, drawings and summary is incorporated herein by reference in its entirety.

What is claimed is:

1. A circuit for reproducing bit timing, comprising:
   (a) a first analog-digital converter for converting a real part signal of a complex modulation signal into a real part digital signal, said complex modulation signal having a base band frequency band and obtained from a received modulation signal modulated into a digital phase;
   (b) a second analog-digital converter for converting an imaginary part signal of said complex modulation signal into an imaginary part digital signal;
   (c) a first detector for receiving said real part digital signal and said imaginary part digital signal, detecting a phase angle of said complex modulation in signal on a complex plane, and transmitting a first signal indicative of said phase angle;
   (d) a delay circuit for delaying said first signal by a symbol interval;
   (e) a second detector for detecting a difference in phase on said complex plane between said complex modulation signals in said symbol interval;
   (f) a third detector for detecting a timing gap between a sampling clock and an optimum sampling point, based on said difference in phase, detected by said second detector, and transmitting a second signal indicative of said timing gap; and
   (g) a signal converter for converting each of said real part digital signal and said imaginary part digital signal into a signal associated with said optimum sampling point, based on said second signal.

2. The circuit as set forth in claim 1, further comprising a clock oscillator transmitting fixed clock signals, and wherein said first analog-digital converter samples and quantizes said real part signal with said fixed clock signals to thereby convert said real part signal into said real part digital signal.

3. The circuit as set forth in claim 1, further comprising a clock oscillator transmitting fixed clock signals, and wherein said second analog-digital converter samples and quantizes said imaginary part signal with said fixed clock signals to thereby convert said imaginary part signal into said imaginary part digital signal.

4. The circuit as set forth in claim 1, wherein said second detector is comprised of a subtracter for making subtraction between said first signal and an output signal transmitted from said delay circuit.

5. A circuit for reproducing bit timing, comprising:
   (a) a first analog-digital converter for converting a real part signal of a complex modulation signal into a real part digital signal, said complex modulation signal having a base band frequency band and obtained from a received modulation signal modulated into a digital phase;
   (b) a second analog-digital converter for converting an imaginary part signal of said complex modulation signal into an imaginary part digital signal;
   (c) a first detector for receiving said real part digital signal and said imaginary part digital signal, detecting a phase angle of said complex modulation signal on a complex plane, and transmitting a first signal indicative of said phase angle;
   (d) a delay circuit for delaying said first signal by a symbol interval;

(e) a second detector for detecting a difference in phase on said complex plane between said complex modulation signals in said symbol interval;

(f) a third detector for detecting a timing gap between a sampling clock and an optimum sampling point, based on said difference in phase, detected by said second detector, and transmitting a second signal indicative of said timing gap;

(g) a first interpolating filter for converting said real part digital signal into a signal associated with an optimum sampling point, based on said second signal; and (h) a second interpolating filter for converting said imaginary part digital signal into a signal associated with an optimum sampling point, based on said second signal.

6. The circuit as set forth in claim 5, further comprising a clock oscillator transmitting fixed clock signals, and wherein said first analog-digital converter samples and quantizes said real part signal with said fixed clock signals to thereby convert said real part signal into said real part digital signal.

7. The circuit as set forth in claim 5, further comprising a clock oscillator transmitting fixed clock signals, and wherein said second analog-digital converter samples and quantizes said imaginary part signal with said fixed clock signals to thereby convert said imaginary part signal into said imaginary part digital signal.

8. The circuit as set forth in claim 5, wherein said second detector is comprised of a subtracter for making subtraction between said first signal and an output signal transmitted from said delay circuit.

9. A circuit for reproducing bit timing, comprising:

(a) a first analog-digital converter for converting a real part signal of a complex modulation signal into a real part digital signal, said complex modulation signal having a base band frequency band and obtained from a received modulation signal modulated into a digital phase;

(b) a second analog-digital converter for converting an imaginary part signal of said complex modulation signal into an imaginary part digital signal;

(c) a first detector for receiving said real part digital signal and said imaginary part digital signal, detecting a phase angle of said complex modulation signal on a complex plane, and transmitting a first signal indicative of said phase angle;

(d) a delay circuit for delaying said first signal by a symbol interval;

(e) a second detector for detecting a difference in phase on said complex plane between said complex modulation signals in said symbol interval;

(f) a third detector for detecting a timing gap between a sampling clock and an optimum sampling point, based on said difference in phase, detected by said second detector, and transmitting a second signal indicative of said timing gap;

(g) a clock oscillator for transmitting fixed clock signals; and (h) a programmable phase shifter for shifting a phase of said fixed clock signals, based on said second signal.

10. The circuit as set forth in claim 9, wherein said first analog-digital converter samples and quantizes said real part signal with the phase-shifted clock signals to thereby convert said real part signal into said real part digital signal.

11. The circuit as set forth in claim 9, wherein said second analog-digital converter samples to thereby convert said imaginary part signal into said imaginary part digital signal.

12. The circuit as set forth in claim 9, wherein said second detector is comprised of a subtracter for making subtraction between said first signal and an output signal transmitted from said delay circuit.

13. A method of reproducing bit timing, comprising the steps of:

(a) converting a real part signal of a complex modulation signal into a real part digital signal, said complex modulation signal having a base band frequency band and obtained from a received modulation signal modulated into a digital phase;

(b) converting an imaginary part signal of said complex modulation signal into an imaginary part digital signal;

(c) detecting a phase angle of said complex modulation signal on a complex plane, based on said real part digital signal and said imaginary part digital signal, and transmitting a first signal indicative of the thus detected phase angle;

(d) delaying said first signal by a symbol interval;

(e) detecting a difference in phase on said complex plane between said complex modulation signals in said symbol interval;

(f) detecting a timing gap between a sampling clock and an optimum sampling point, based on said difference in phase; and (g) converting each of said real part digital signal and said imaginary part digital signal into a signal associated with said optimum sampling point, based on said timing gap.

14. The method as set forth in claim 13, wherein said real part signal is sampled and quantized with fixed clock signals to thereby be converted into said real part digital signal in said step (a).

15. The method as set forth in claim 13, wherein said imaginary part signal is sampled and quantized with fixed clock signals to thereby be converted into said imaginary part digital signal in step (b).

16. The method as set forth in claim 13, wherein said difference in phase is detected by making subtraction between said complex modulation signals in said symbol interval in said step (e).

17. A method of reproducing bit timing, comprising the steps of:

(a) converting a real part signal of a complex modulation signal into a real part digital signal, said complex modulation signal having a base band frequency band and obtained from a received modulation signal modulated into a digital phase;

(b) converting an imaginary part signal of said complex modulation signal into an imaginary part digital signal;

(c) detecting a phase angle of said complex modulation signal on a complex plane, based on said real part digital signal and said imaginary part digital signal, and transmitting a first signal indicative of the thus detected phase angle;

(d) delaying said first signal by a symbol interval;

(e) detecting a difference in phase on said complex plane between said complex modulation signals in said symbol interval;

(f) detecting a timing gap between a sampling clock and an optimum sampling point, based on said difference in phase; and (g) shifting a phase of fixed clock signals, based on said timing gap.

18. The method as set forth in claim 17, wherein said real part signal is sampled and quantized with the phase-shifted clock signals to thereby be converted into said real part digital signal in said step (a).

19. The method as set forth in claim 17, wherein said imaginary part signal is sampled and quantized with the phase-shifted clock signals to thereby be converted into said imaginary part digital signal in step (b).

20. The method as set forth in claim 17, wherein said difference in phase is detected by making subtraction between said complex modulation signals in said symbol interval in said step (e).

* * * * *